US009486962B1

(12) United States Patent
Dugan et al.

(10) Patent No.: US 9,486,962 B1
(45) Date of Patent: Nov. 8, 2016

(54) FINE POWDER RECOATER FOR THREE-DIMENSIONAL PRINTER

(71) Applicant: The ExOne Company, North Huntingdon, PA (US)

(72) Inventors: Anthony S. Dugan, McKeesport, PA (US); Joseph J. Bolt, Irwin, PA (US); Andrew P. Klein, Pittsburgh, PA (US)

(73) Assignee: The ExOne Company, North Huntingdon, PA (US)

( * ) Notice: Subject to any disclaimer, the term of this patent is extended or adjusted under 35 U.S.C. 154(b) by 0 days.

(21) Appl. No.: 15/161,361

(22) Filed: May 23, 2016

(51) Int. Cl.
B29C 67/00 (2006.01)
B33Y 30/00 (2015.01)
B33Y 40/00 (2015.01)

(52) U.S. Cl.
CPC ....... *B29C 67/0085* (2013.01); *B29C 67/0077* (2013.01); *B33Y 30/00* (2014.12); *B33Y 40/00* (2014.12)

(58) Field of Classification Search
CPC .......... B29C 67/0077; B29C 67/0085; B28B 13/0215; B28B 13/022; B28B 13/023; B28B 13/026; B65D 88/26; B65D 88/28; B07B 1/00; B07B 1/28; B65B 37/04
USPC ............. 264/497; 425/174.4, 578, 579, 580; 209/240, 244, 245
See application file for complete search history.

(56) References Cited

U.S. PATENT DOCUMENTS

| | | | | |
|---|---|---|---|---|
| 1,545,376 A * | 7/1925 | Weatherby | ............. | B65D 88/66 193/20 |
| 3,902,995 A * | 9/1975 | Jones | ..................... | B65G 69/12 209/240 |
| 4,583,660 A * | 4/1986 | La Barre | ................ | B65D 88/28 222/1 |
| 5,284,190 A * | 2/1994 | Jones | ..................... | A01C 11/00 141/129 |
| 7,799,253 B2 | 9/2010 | Hochsmann et al. | | |
| 9,254,535 B2 | 2/2016 | Buller et al. | | |
| 2006/0219315 A1* | 10/2006 | Cox | ........................ | B65G 53/22 141/67 |
| 2014/0175708 A1* | 6/2014 | Echigo | ................ | B29C 67/0077 264/460 |
| 2015/0306819 A1* | 10/2015 | Ljungblad | ............. | B22F 3/1055 419/55 |

FOREIGN PATENT DOCUMENTS

FR        2166526 A5 *  8/1973   ......... B29C 67/0077

* cited by examiner

*Primary Examiner* — Timothy Kennedy
(74) *Attorney, Agent, or Firm* — Thomas Lizzi

(57) ABSTRACT

Powder-layer three-dimensional printer recoaters, which are adapted for use with fine powders, are disclosed. The recoaters comprise a controllably vibrated traveling powder dispenser having a hopper section adapted to contain the build powder, an opening through which the powder can be controllably discharged laterally into a chamber which is located beside the opening and which has a mesh covering at least a portion of its bottom. The recoaters also comprise a vibrator that is operably connected to the traveling powder dispenser and is adapted to selectively cause the powder to flow from the hopper through the opening and be discharged through the mesh. In some embodiments, the recoaters also comprise a smoothing device which is adapted to smoothen the powder dispensed through the mesh. In some embodiments the smoothing device is adapted to compact the density of the dispensed powder level a selectable amount. Also disclosed are powder-layer three-dimensional printers having such recoaters.

20 Claims, 4 Drawing Sheets

FINE POWDER RECOATER FOR THREE-DIMENSIONAL PRINTER

BACKGROUND

Field of the Invention

The present invention relates to powder recoaters adapted for use in three-dimensional printing and three-dimensional printers having such powder recoaters.

Background of the Art

There are today various types of three-dimensional printers, i.e. devices that convert electronic representations of three-dimensional articles into the articles themselves by the systematic building-up of one or more materials. The device of the present invention finds particular utility with the types of three-dimensional printers which create three-dimensional articles by selectively binding together preselected areas of successively deposited layers of powder. These types of three-dimensional printers are referred to herein as "powder-layer three-dimensional printers" because the construction of the three-dimensional article by such printers utilizes layers of powders as a build material. Examples of such types of powder-layer three-dimensional printers include, without limitation, the binder-jet three-dimensional printers, the selective sintering three-dimensional printers, and the electron beam melting three-dimensional printers.

It is to be understood that the term "powder" is also sometimes referred to in the art as "particulate material" or "particles" and the term "powder" is to be construed herein as meaning any such material, by whatever name, that is used in such three-dimensional printers as a layer-forming material. Powder may comprise any type of material capable of taking on the powder form, e.g. metal, plastics, ceramics, carbon, graphite, composite materials, minerals, etc., and combinations thereof. The term "build powder" is used herein to refer to a powder which is used to form the powder layers and from which the article is built in a powder-layer three-dimensional printer.

During the operation of a powder-layer three-dimensional printer, a first layer of a build powder is deposited upon a vertically indexible build platform and then successive powder layers are deposited one at a time upon the first powder layer. Selected portions of selected powder layers are treated to bind the powders in those portions together as one or more three-dimensional articles are formed. Collectively, the portions of the deposited powder layers which are not bound together are referred to herein as a "powder bed."

The process of forming a powder layer is sometimes referred to in the art, and is referred to herein, as "recoating". The device or combination of devices of a particular powder-layer three-dimensional printer that accomplishes the recoating is sometimes referred to in the art, and is referred to herein, as a "powder recoater" or more simply as a "recoater."

In some powder-layer three-dimensional printers, each powder layer is formed by transferring a predetermined quantity of build powder from an open-top stationary powder reservoir by first indexing upward a platform which supports the powder within the reservoir a predetermined amount to raise the predetermined quantity above the reservoir walls and then pushing that quantity of powder across the top of the build platform or the powder bed, e.g. by a doctor blade or a counter-rotating roller, to form a powder layer. Examples of such recoaters are described in U.S. Pat. No. 5,387,380 to Cima et al. Such recoaters are generally limited for use with relatively small size powder beds, i.e. those which having recoating direction lengths of under a few tens of centimeters.

In some powder-layer three-dimensional printers, each powder layer is deposited upon the build platform or upon an extant powder bed by a recoater comprising a traveling powder dispenser which dispenses a build powder through an open slit as it traverses across the build platform or powder bed. Examples of such recoaters are described in U.S. Pat. No. 7,799,253 B2 to Hochsmann et al. Such recoaters may or may not include some device which is adapted to smoothen the top of the powder layer. As used herein, the term "smoothen" is to be interpreted as meaning operating on a quantity of powder so as to do at least one of (a) form at least a portion of the quantity of powder into a layer, (b) make at least a portion of the surface of a layer comprising the quantity of powder less rough, and (c) compress at least a portion of a layer comprising the quantity of powder. A mechanism which smoothens a quantity of powder is referred to herein as a "smoothing device."

Recently, recoaters for powder-layer three-dimensional printers have been developed which discharge powder from a traveling powder dispenser which has a mesh, i.e. a screen or a sieve, attached to its side or bottom so that powder can be dispensed through the mesh onto the powder bed. Examples of such recoaters are described in U.S. Pat. No. 9,254,535 B2 to Buller et al. Such recoaters may or may not include a smoothing device.

A problem with prior art recoaters which include traveling powder dispensers is that they are not well adapted for use with fine powders. Fine powders, as that term is used herein, are those build powders which are prone to flow problems and/or to agglomeration problems due to the fact that for them surface-related forces are no longer negligible in relation to gravitational forces. In general, fine powders have an average effective diameter of under 20 microns, although for some powder materials having high levels of surface-related forces, the average effective diameter at which they fall within this definition of fine powders is larger than 20 microns. It is to be understood that the surface-related forces do not only include forces by which one particle is inherently attracted to another, but also include the forces arising from materials which at least partially coat a particle's surface, e.g. adsorbed moisture.

SUMMARY OF THE INVENTION

The present invention provides powder-layer three-dimensional printer recoaters which are adapted for use with fine powders. The inventive recoaters comprise a controllably vibrated traveling powder dispenser having a hopper section adapted to contain the build powder, an opening through which the powder can be controllably discharged laterally into a chamber which is located beside the opening and which has a mesh comprising at least a portion of its bottom. The recoaters also comprise a vibrator that is operably connected to the traveling powder dispenser and is adapted to selectively cause the powder to flow from the hopper through the opening and be discharged through the mesh. Although such recoaters overcome the aforementioned problem of dispensing fine powders, it is to be understood that, in some embodiments, the recoaters are adapted dispense any size or type of build powder for powder-layer three-dimensional printing.

In some embodiments, the inventive recoaters also comprise a smoothing device which is adapted to smoothen the powder dispensed through the mesh. Examples of smoothing devices include rollers, counter-rotating rollers, doctor blades, and tamping platens. In some embodiments the smoothing device is adapted to compact the density of the dispensed powder level a selectable amount.

In another aspect, the present invention also includes powder-layer three-dimensional printers having the recoaters described in the previous two paragraphs.

BRIEF DESCRIPTION OF THE DRAWINGS

The criticality of the features and merits of the present invention will be better understood by reference to the attached drawings. It is to be understood, however, that the drawings are designed for the purpose of illustration only and not as a definition of the limits of the present invention.

DESCRIPTION OF PREFERRED EMBODIMENTS

Figure 1:
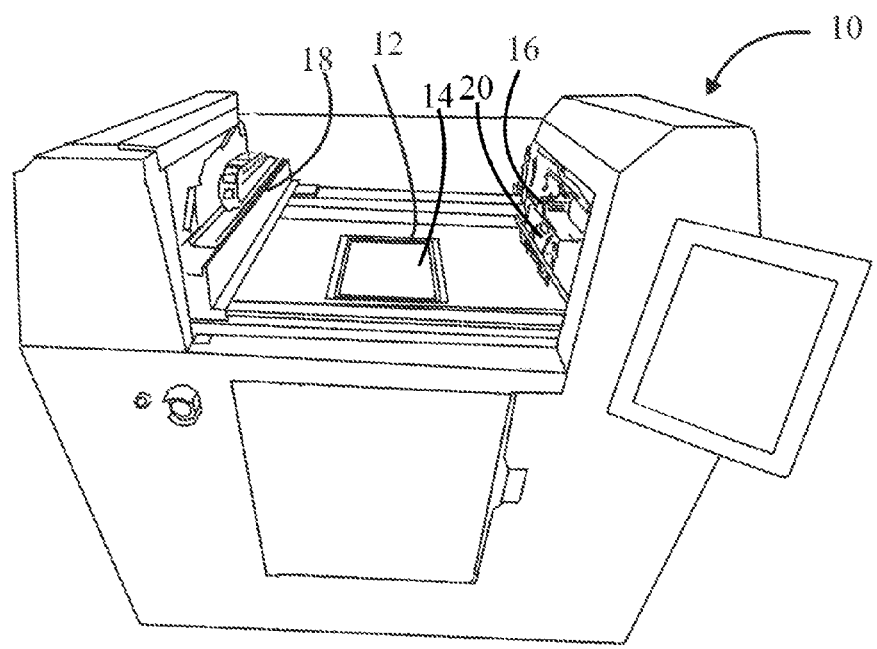
FIG. 1 is shown a schematic perspective view of an embodiment in the form of powder-layer three-dimensional printer 10.

Some preferred embodiments of the present invention are described in this section in detail sufficient for one skilled in the art to practice the present invention without undue experimentation. It is to be understood, however, that the fact that a limited number of preferred embodiments are described in this section does not in any way limit the scope of the present invention as set forth in the claims.

It is to be understood that whenever a range of values is described herein, i.e. whether in this section or any other part of this patent document, the range includes its end points and every point therebetween as if each and every such point had been expressly described. Unless otherwise stated, the words "about" and "substantially" as used herein are to be construed as meaning the normal measuring and/or fabrication limitations related to the value or condition which the word "about" or "substantially" modifies. Unless expressly stated otherwise, the term "embodiment" is used herein to mean an embodiment of the present invention.

The phrase "traveling powder dispenser" is to be understood to mean a device which is adapted to controllably traverse across a build platform or powder bed and to dispense a build powder onto the build platform or powder bed as it traverses across the build platform or powder bed.

The recoaters of the present invention have particular utility with powder-layer three-dimensional printers. Although the recoaters may be used with any type of powder-layer three-dimensional printers, for the sake of conciseness, the only type of powder-layer three-dimensional printers that will be discussed in this section are those of the binder-jetting three-dimensional printer type. The binder-jetting three-dimensional printers are also sometimes in the art referred to as "three-dimensional inkjet printers" because the binder jetting is done using a print head that resembles those developed for inkjet printing. The basic binder jetting three-dimensional printing process was invented 1980's and developed in the 1990's at the Massachusetts Institute of Technology and is described in several United States patents, including the following U.S. Pat. No. 5,387,380 to Cima et al., U.S. Pat. No. 5,490,882 to Sachs et al., U.S. Pat. No. 5,490,962 to Cima et al., U.S. Pat. No. 5,518,680 to Cima et al., U.S. Pat. No. 5,660,621 to Bredt et al., U.S. Pat. No. 5,775,402 to Sachs et al., U.S. Pat. No. 5,807,437 to Sachs et al., U.S. Pat. No. 5,814,161 to Sachs et al., U.S. Pat. No. 5,851,465 to Bredt, U.S. Pat. No. 5,869,170 to Cima et al., U.S. Pat. No. 5,940,674 to Sachs et al., U.S. Pat. No. 6,036,777 to Sachs et al., U.S. Pat. No. 6,070,973 to Sachs et al., U.S. Pat. No. 6,109,332 to Sachs et al., U.S. Pat. No. 6,112,804 to Sachs et al., U.S. Pat. No. 6,139,574 to Vacanti et al., U.S. Pat. No. 6,146,567 to Sachs et al., U.S. Pat. No. 6,176,874 to Vacanti et al., U.S. Pat. No. 6,197,575 to Griffith et al., U.S. Pat. No. 6,280,771 to Monkhouse et al., U.S. Pat. No. 6,354,361 to Sachs et al., U.S. Pat. No. 6,397,722 to Sachs et al., U.S. Pat. No. 6,454,811 to Sherwood et al., U.S. Pat. No. 6,471,992 to Yoo et al., U.S. Pat. No. 6,508,980 to Sachs et al., U.S. Pat. No. 6,514,518 to Monkhouse et al., U.S. Pat. No. 6,530,958 to Cima et al., U.S. Pat. No. 6,596,224 to Sachs et al., U.S. Pat. No. 6,629,559 to Sachs et al., U.S. Pat. No. 6,945,638 to Teung et al., U.S. Pat. No. 7,077,334 to Sachs et al., U.S. Pat. No. 7,250,134 to Sachs et al., U.S. Pat. No. 7,276,252 to Payumo et al., U.S. Pat. No. 7,300,668 to Pryce et al., U.S. Pat. No. 7,815,826 to Serdy et al., U.S. Pat. No. 7,820,201 to Pryce et al., U.S. Pat. No. 7,875,290 to Payumo et al., U.S. Pat. No. 7,931,914 to Pryce et al., U.S. Pat. No. 8,088,415 to Wang et al., U.S. Pat. No. 8,211,226 to Bredt et al., and U.S. Pat. No. 8,465,777 to Wang et al.

For ease of description the powder discharge from the inventive recoaters is described at some places herein in terms of a desired amount of powder. It is to be understood that the present invention includes controlling one or both of the amount of powder discharged from a recoater and the rate at which powder is discharged from the recoater.

Referring now to FIG. 1, there is shown a schematic perspective view of an embodiment in the form of powder-layer three-dimensional printer 10. The powder-layer three-dimensional printer 10 includes a removable build box 12 having a vertically indexible build platform (not visible) and containing a powder bed 14, a recoater 16, and a selectively positionable binder-jet printing device 18. During operation, the recoater 16 is moved over the build platform or powder bed 14 to deposit a powder layer thereupon. If the recoater 16 includes a smoothing device, e.g. the smoothing device 20, the smoothing device is employed to smoothen the deposited powder to form a uniformly thick powder layer upon the pre-existing top surface of the powder bed 14. This may be accomplished during the traverse of the powder bed 14 by the recoater 16 during which the powder is dispensed or during a subsequent traverse of the powder bed 14. Another powder layer may then be deposited, if desired, or the binder-j et printing device 18 may then be moved over the powder bed 14 to selectively deposit binder onto the newly deposited layer and then moved back off to the left of the powder bed 14 to permit the deposition of the next powder layer onto the powder bed 14.

Figure 2A:
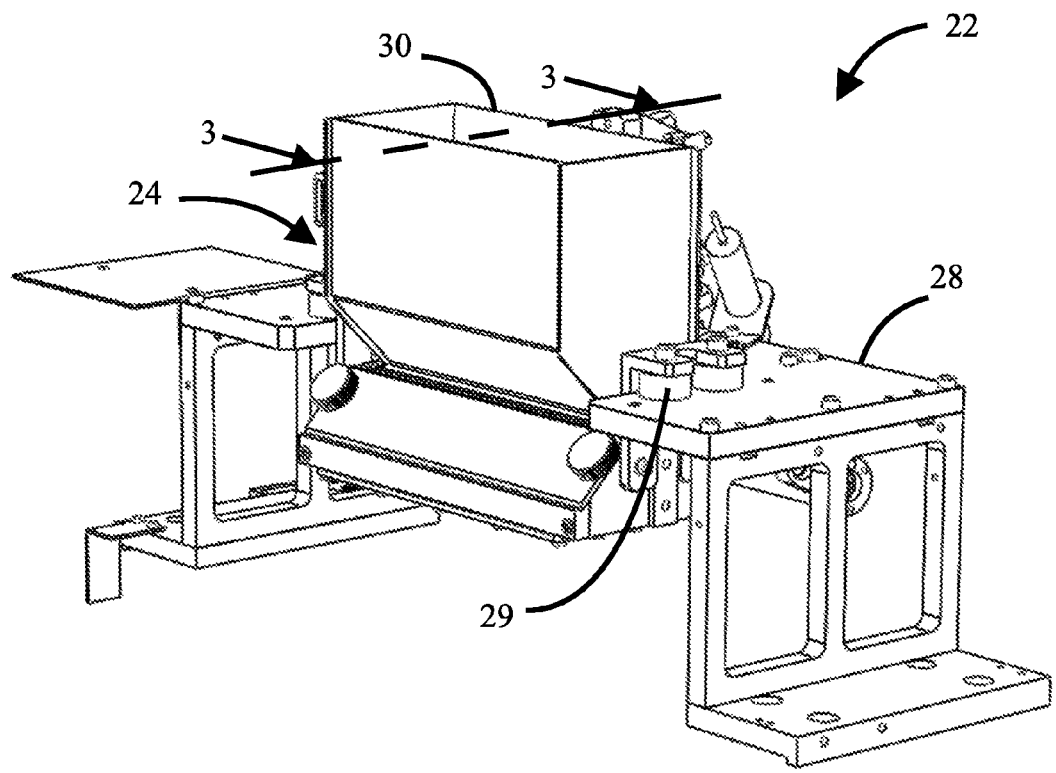
FIGS. 2A-2C are, respectively, front, back, and bottom perspective views of an embodiment recoater 22.
Figure 2B:
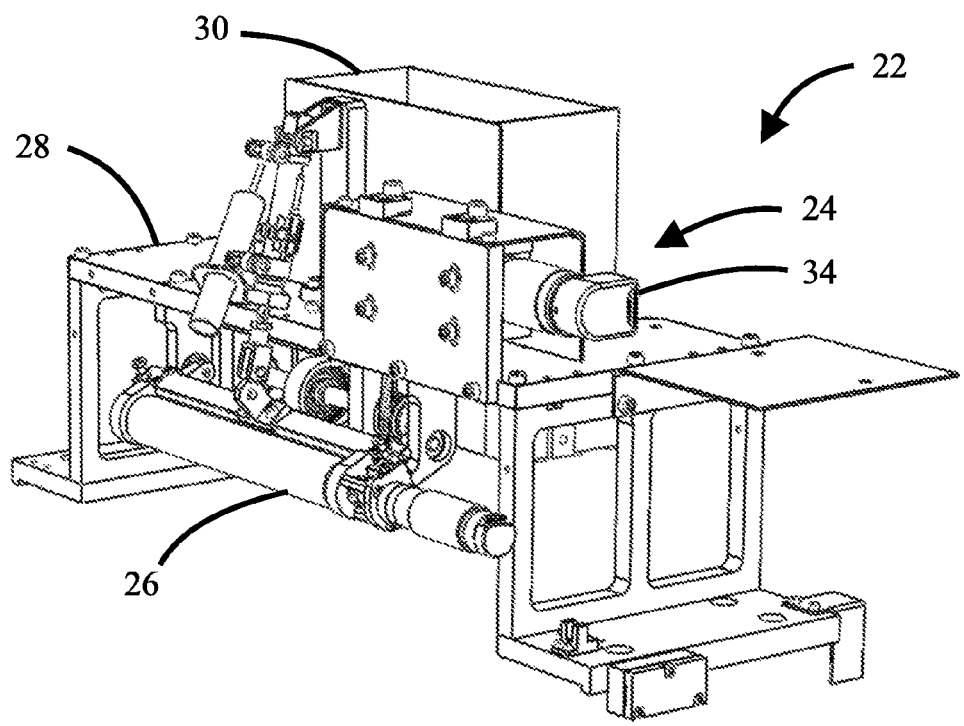
Figure 2C:
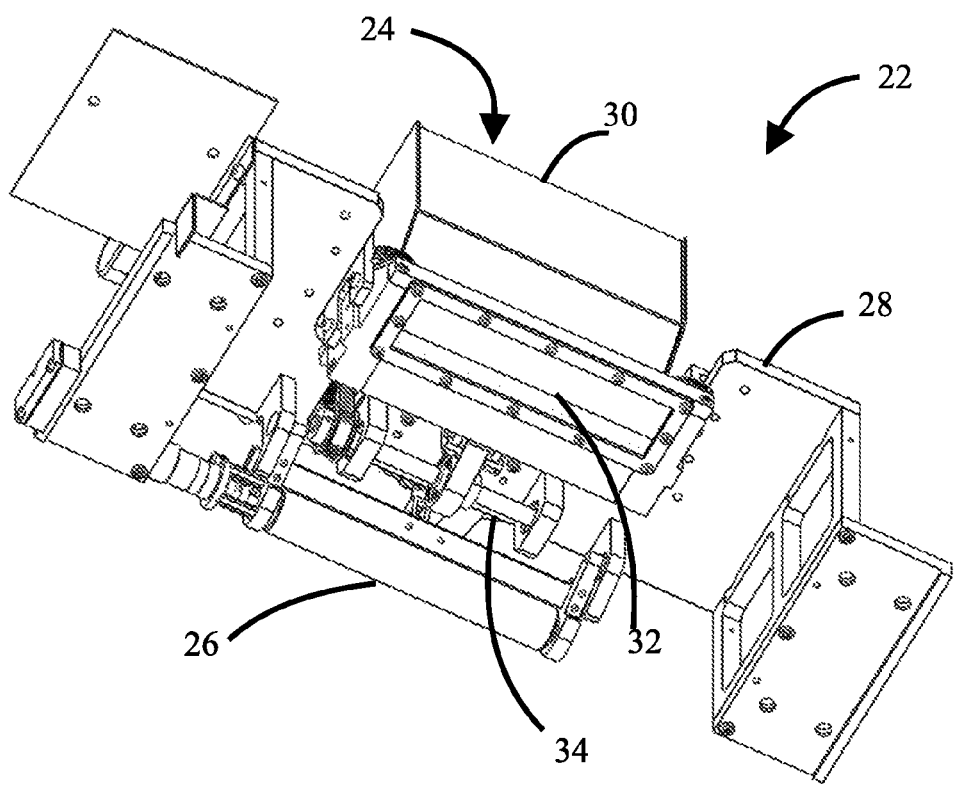

Refer now to FIGS. 2A-2C, which show, respectively, front, back, and bottom perspective views of an embodiment recoater 22. The recoater 22 includes a traveling powder dispenser 24 and a smoothing device in the form of a motor driven roller 26, both of which are supported by the bridge trolley 28 so as to be able to selectively traverse a powder bed. The powder dispenser 24 includes a hopper 30 for containing a desired amount of a build powder (not depicted) and a mesh 32 through which the powder is selectively discharged. The recoater 22 also includes a vibrator 34 which is operably connected to the powder dispenser 24 so that selectively operating the vibrator 34 causes powder to flow from the hopper 30 and to be discharged through the mesh 32.

Figure 3A:
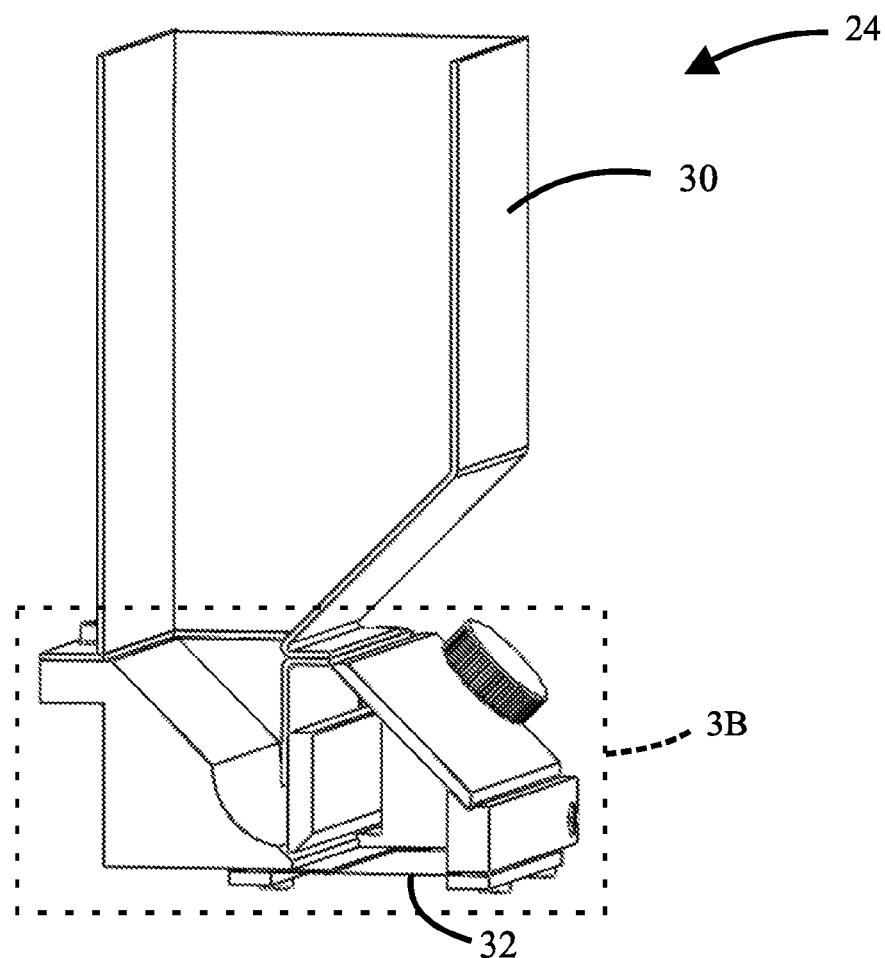
FIG. 3A is a perspective cross-sectional view of the powder dispenser 24 apart from the rest of the recoater 22 and sectioned along the cutting plane 3-3 shown in FIG. 2A.
Figure 3B:
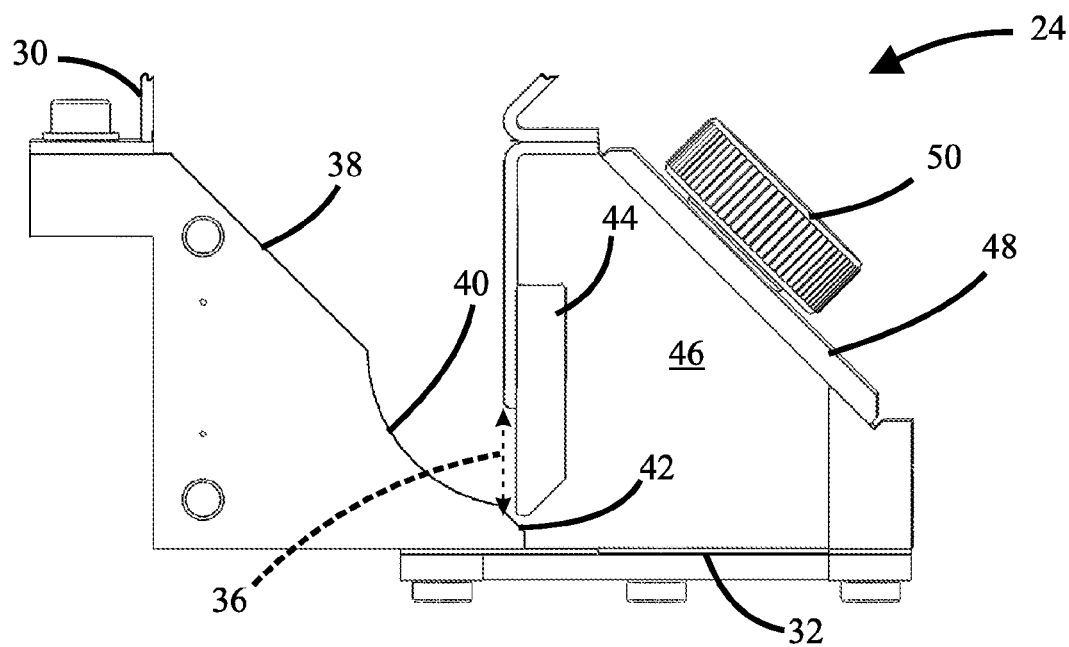
FIG. 3B is a side cross-sectional closer-up view of the lower portion of the powder dispenser 24 which is enclosed within the dashed-line box 3B in FIG. 3A.

Refer now to FIGS. 3A and 3B. FIG. 3A shows a perspective cross-sectional view of the powder dispenser 24 apart from the rest of the recoater 22 and sectioned along the cutting plane 3-3 shown in FIG. 2A. FIG. 3B shows a side cross-sectional closer-up view of the lower portion of the powder dispenser 24 which is enclosed within the dashed-line box 3B in FIG. 3A. As already mentioned, the powder dispenser 24 includes a powder hopper 30 adapted to contain a desired amount of powder and a mesh 32 through which the powder is selectively dispensed. The bottom portion of the powder hopper 30 has a lateral opening 36 (as indicated by the double-headed dashed-line arrow), a first inclined planar surface 38, an arcuate surface 40, and a second inclined planar surface 42. The powder dispenser 24 has a selectably controllable gate 44 located adjacent to the opening 36 which is adapted to control the amount of powder which exits through the opening 36. The powder dispenser 24 also has a chamber 46 located beside the opening 36. The bottom of the chamber 46 includes the mesh 32. The powder dispenser 24 also has a window 48 removably held in place by knob screws, e. g. knob screw 50, for viewing inside and cleaning the chamber 46.

During operation, the powder (not shown) contained within the powder hopper 30 remains in place until it is agitated by a vibrator, e.g. vibrator 34 shown in FIG. 2B. When agitated by the selective operation of the vibrator, the powder flows across the bottom surfaces of the powder hopper 30, i.e. the first inclined planar surface 38, the arcuate surface 40, and the second inclined planar surface 42. The flowing powder exits the powder hopper 30 through the opening 36 flowing past the bottom of the gate 44 into the chamber 46 where it is dispensed out of the powder dispenser 24 through the mesh 32. The dispensing preferably occurs as the powder dispenser 24 travels across a powder bed or powder support platform while being supported by a trolley, e.g. the bridge trolley 28 shown in FIGS. 2A-2C.

Figure 4:
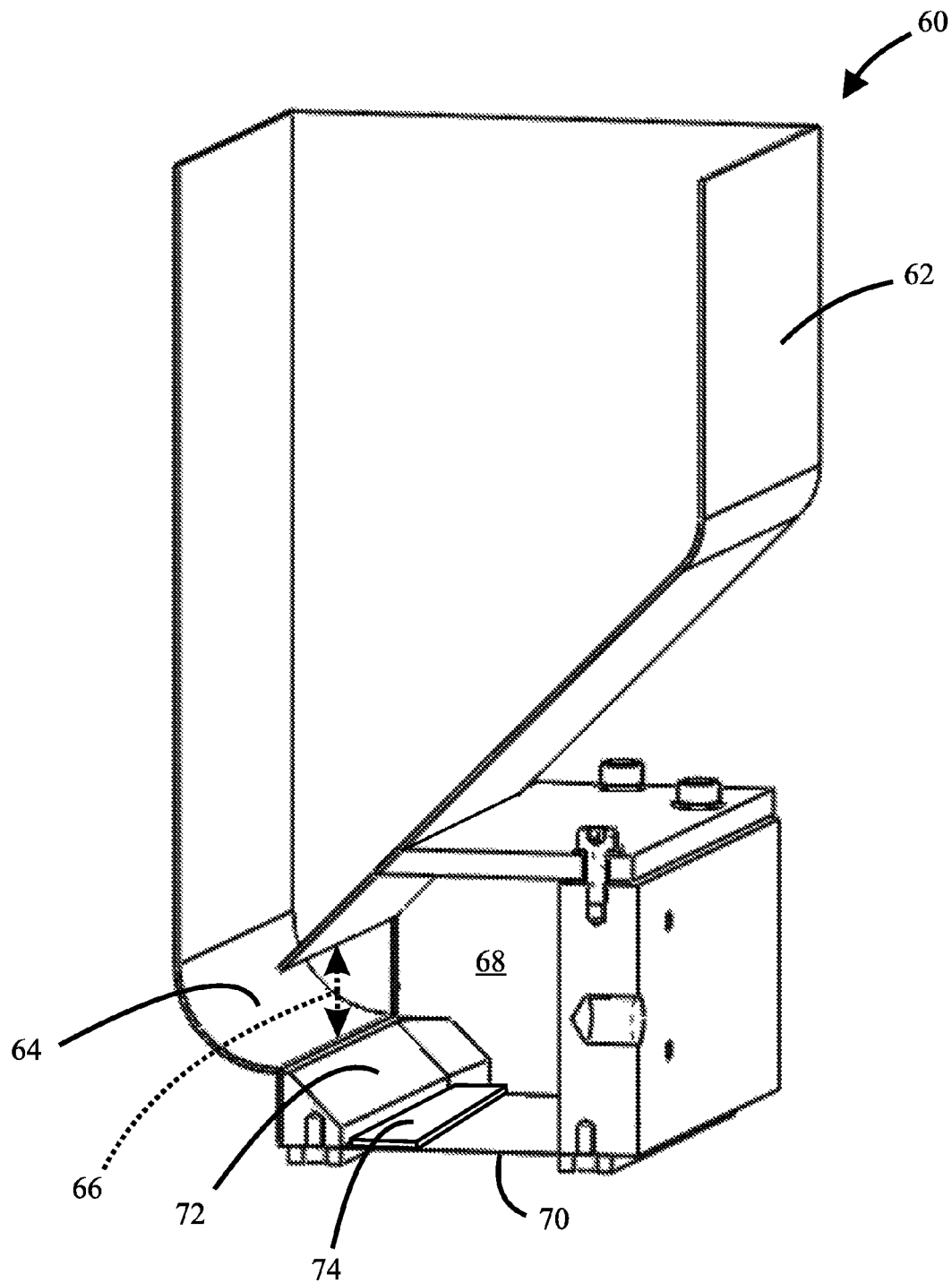
FIG. 4 is a perspective cross-sectional view of a powder dispenser embodiment, i.e. the powder dispenser 60, shown apart from its traveling support mechanism.

FIG. 4 shows a perspective cross-sectional view of another powder dispenser embodiment, i.e. the powder dispenser 60, shown apart from its traveling support mechanism. The powder dispenser 60 is of a simpler design than is the powder dispenser 24. The powder dispenser 60 includes a powder hopper 62 which has an arcuate surface 64 at its bottom and a lateral opening 66 (as indicated by a double-headed dashed-line arrow). The powder dispenser 60 also includes a chamber 68 having a mesh 70 on its bottom. The powder dispenser 60 also includes an inclined planar surface 72 which, in part, defines the chamber 68. A portion of the mesh 70 is selectively blanked off by a planar cover 74 so as to control the amount and portion of the mesh 70 that is available for discharging powder. Although the planar cover 74 is shown blanking off the top surface of the mesh 70, one or more planar covers may be used to blank off any desired portion of the top and/or bottom surface of the mesh. Such planar covers may be of any shape, e.g. rectangular, curved, etc., and may be continuous or have cutouts through which powder can flow.

Although for each of the two embodiments described above, the powder hopper portion of the traveling powder dispenser includes an arcuate surface at or near its bottom proximate to the lateral discharge opening of the powder hopper, not all embodiments include such an arcuate section while others have more than one arcuate surface. Preferred embodiments include at least one arcuate surface as it is believed that such a surface aids in the lateral flow of the powder to the discharge opening. Also, although arcuate surfaces of any radius may be used embodiments, it is preferred that such arcuate surfaces have a radius of at least 1.2 centimeters when the recoater is to be used with fine powders.

The mesh is preferably sized so to allow the power dispenser to discharge the build powder across the entire width of the powder bed. In some embodiments, the mesh is sized so as to enable the recoater to discharge powder over the entire powder bed from a stationary position. The choice of mesh with regard to characteristics such as opening size and shape, material of construction, and strand size depends on the particle size distribution, particle shape, mass density, and other factors which affect the flowability of the build powder that is to be used with the inventive recoater. It is often the case that the mesh opening size may be much larger than the average particle size of the build powder as powder bridging can act to curtail powder flow through the mesh when the vibrator is turned off.

The vibrator 34 that is part of the embodiment depicted in FIGS. 2A-2C and FIGS. 3A-3B is of the motor-driven eccentric type in which the motor is supported by the bridge trolley 28 and the vibrating mechanism is attached directly to the powder dispenser 30. The powder dispenser 30 is otherwise vibrationally isolated from the bridge trolley 28 by vibration dampener, e.g. dampening support 29, so as to minimize the amount of vibrational energy needed to operate the powder dispenser 30 and to prevent unnecessary wear on the vibrator components and vibration-induced fastener loosening on the bridge trolley 28. Any type of a vibration dampener known in the art may be used in embodiments to vibrationally isolate, at least in part, the powder dispenser from its trolley or other supporting transporting device. The choice of the vibration dampener to be used depends in part upon whether at the location in which it is used, the powder dispenser hangs from or is seated upon the transporting device. Nonetheless, the present invention includes embodiments in which the powder dispenser is not vibrationally isolated from its transporting support device.

Any type of vibrator known in the art may be used the vibrator of the present invention. The vibrator may operate in the sonic and/or ultrasonic range. More than one vibrator and vibrator type may be used depending on the nature and amount of the build powder as well as the mass and other physical characteristics of the powder dispenser and whether or not the powder dispenser is vibrationally isolated from its transporting support device. The vibrator or vibrators are to be positioned and adapted to operate, e.g. through the use of a manual or automatic control system, to selectively cause powder to flow through the lateral opening of the powder hopper onto and through the mesh in the chamber that is beside the opening. In embodiments, a vibrator needs only to be operably connected to the powder dispenser, adapted to selectively cause the build powder within the powder hopper of the powder dispenser to flow through the lateral opening of the powder hopper and be dispensed through the mesh.

It is to be understood that although the upper portions of the powder hoppers 30, 62 described above have somewhat similar shapes, the upper portions of powder hoppers of embodiment recoaters may have any shape suitable for containing a desired amount of a build powder.

Although the recoaters of the present invention, e.g. the recoater 22 that is described in conjunction with FIGS. 2A-2C, may include a smoothing device, not all embodiments include a smoothing device. Examples of such smoothing devices include rollers, counter-rotating rollers, doctor blades, and tamping platens. In some embodiments, the smoothing device is adapted to compact the density of the dispensed powder level a selectable amount.

The present invention also includes powder-layer three-dimensional printers, e.g. the powder-layer three-dimensional printer 10 depicted in FIG. 1, which include any of the embodiments of recoaters described above.

While only a few embodiments of the present invention have been shown and described, it will be obvious to those skilled in the art that many changes and modifications may be made thereunto without departing from the spirit and scope of the invention as described in the claims. All United States patents and patent applications, all foreign patents and patent applications, and all other documents identified herein are incorporated herein by reference as if set forth in full herein to the full extent permitted under the law.

The invention claimed is:

1. A recoater comprising:
 a traveling powder dispenser having
  (i) a hopper adapted to contain a build powder,
  (ii) a first chamber having a bottom, the bottom including a mesh, and
  (iii) an opening adapted to controllably discharge the build powder laterally from the hopper into the first chamber; and
 a vibrator operably connected to the powder dispenser;
  wherein the first chamber is located beside the opening and the vibrator is adapted to selectively cause the build powder to flow from the hopper through the opening and to be discharged through the mesh.

2. The recoater of claim 1 wherein the first chamber includes an inclined surface adapted to receive at least some of the build powder discharging from the opening and to convey the received build powder to the mesh.

3. The recoater of claim 1 wherein the hopper has a bottom section, the bottom section having an arcuate surface proximate to the opening.

4. The recoater of claim 1 wherein the hopper has a bottom section having an inclined planar surface.

5. The recoater of claim 1 further comprising a transport support device and a vibration dampener, whereby the transport support device is adapted to transport the powder dispenser over a powder bed and the powder dispenser is at least in part vibrationally isolated from the transport support device by the vibration dampener.

6. The recoater of claim 1 wherein the vibrator is adapted to vibrate in an ultrasonic frequency range.

7. The recoater of claim 1 further comprising a smoothing device adapted to smoothen the powder discharged through the mesh.

8. The recoater of claim 1 further comprising a gate adapted to selectively control the size of the opening.

9. The recoater of claim 1 further comprising a planar cover adapted to blank off at least portion of the mesh.

10. The recoater of claim 1 wherein the hopper has a bottom section, the bottom section having an arcuate surface proximate to the opening, the arcuate surface having a radius of at least 1.2 centimeters.

11. A powder-layer three-dimensional printer comprising a recoater, the recoater including:
 a traveling powder dispenser having
  (i) a hopper adapted to contain a build powder,
  (ii) a first chamber having a bottom, the bottom including a mesh, and
  (iii) an opening adapted to controllably discharge the build powder laterally from the hopper into the first chamber; and
 a vibrator operably connected to the powder dispenser;
  wherein the first chamber is located beside the opening and the vibrator is adapted to selectively cause the build powder to flow from the hopper through the opening and to be discharged through the mesh.

12. The powder-layer three-dimensional printer of claim 11 wherein the first chamber includes an inclined surface adapted to receive at least some of the build powder discharging from the opening and to convey the received build powder to the mesh.

13. The powder-layer three-dimensional printer of claim 11 wherein the hopper has a bottom section, the bottom section having an arcuate surface proximate to the opening.

14. The powder-layer three-dimensional printer of claim 11 wherein the hopper has a bottom section having an inclined planar surface.

15. The powder-layer three-dimensional printer of claim 11 further comprising a transport support device and a vibration dampener, whereby the transport support device is adapted to transport the powder dispenser over a powder bed and the powder dispenser is at least in part vibrationally isolated from the transport support device by the vibration dampener.

16. The powder-layer three-dimensional printer of claim 11 wherein the vibrator is adapted to vibrate in an ultrasonic frequency range.

17. The powder-layer three-dimensional printer of claim 11 further comprising a smoothing device adapted to smoothen the powder discharged through the mesh.

18. The powder-layer three-dimensional printer of claim 11 further comprising a gate adapted to selectively control the size of the opening.

19. The powder-layer three-dimensional printer of claim 11 further comprising a planar cover adapted to blank off at least portion of the mesh.

20. The powder-layer three-dimensional printer of claim 11 wherein the hopper has a bottom section, the bottom section having an arcuate surface proximate to the opening, the arcuate surface having a radius of at least 1.2 centimeters.

* * * * *